United States Patent [19]
Hayashi et al.

[11] Patent Number: 5,693,690
[45] Date of Patent: Dec. 2, 1997

[54] RUBBER OR RESIN COMPOSITION

[75] Inventors: Kazuyuki Hayashi; Minoru Ohsugi; Hiroko Morii; Koso Aoki, all of Hiroshima, Japan

[73] Assignee: Toda Kogyo Corporation, Japan

[21] Appl. No.: 628,018

[22] Filed: Apr. 4, 1996

[30] Foreign Application Priority Data

Apr. 7, 1995 [JP] Japan .................. 7-108214

[51] Int. Cl.$^6$ .................. C08K 9/06; C08K 9/10; C08K 3/22; C08K 3/36
[52] U.S. Cl. .................. 523/216; 524/431; 524/492; 524/493; 523/210
[58] Field of Search .................. 523/216, 210; 524/431, 492, 493

[56] References Cited

U.S. PATENT DOCUMENTS

| | | | |
|---|---|---|---|
| 2,837,495 | 6/1958 | Allen | 524/431 |
| 5,269,842 | 12/1993 | Katamoto | 106/457 |
| 5,470,660 | 11/1995 | Misawa et al. | 428/403 |
| 5,512,405 | 4/1996 | Misawa et al. | 428/403 |

FOREIGN PATENT DOCUMENTS

| | | |
|---|---|---|
| A-0-453 261 | 10/1991 | European Pat. Off. |
| A-0-592 188 | 4/1994 | European Pat. Off. |
| A-53 036 538 | 4/1978 | Japan |

*Primary Examiner*—Peter A. Szekely
*Attorney, Agent, or Firm*—Nixon & Vanderhye

[57] ABSTRACT

A rubber or resin composition comprises:

0.1 to 10.0 parts by weight of iron oxide particles composed of iron oxide core which contains 0.21 to 2.14 wt % of silicon, calculated as $SiO_2$, and 0.01 to 10.0 wt %, calculated as $SiO_2$, of a precipitate composed of silicon, which adheres to the surfaces of said iron oxide core, a sphere ratio, maximum diameter/minimum diameter, of said iron oxide particles being of 0.7 to 1.0, an average particle diameter of said iron oxide particles being 0.05 to 1.0 μm, a geometric standard deviation σg of said iron oxide particles which shows the particle size distribution being not more than 1.40, a bulk density of said iron oxide particles being 0.80 to 1.5 g/cm$^3$, and a surface activity of said iron oxide particles which is indicated by the number of cyclohexanone molecules adsorbed to the surfaces of the iron oxide particles, number of molecules/nm$^2$, being not more than 1.70; and 90 to 99.9 parts by weight of rubber or thermoplastic resin.

13 Claims, No Drawings

RUBBER OR RESIN COMPOSITION

BACKGROUND OF THE INVENTION

The present invention relates to a rubber or resin composition. More particularly, the present invention relates to a rubber or resin composition which is capable of suppressing to the minimum the decomposition or degeneration, i.e., the deterioration of rubber or a thermoplastic resin which is caused by the influence of the heat applied to the rubber or the thermoplastic resin during processing or the light during exposure to the open air when the rubber or the thermoplastic resin is colored with an iron oxide pigment.

Thermoplastic resins such as vinyl chloride resin, polyester resin, polypropylene resin, polyethylene resin, polyamide resin, polycarbonate resin and ABS (acrylonitrile-butadiene-styrene copolymer) resin, natural rubber; and synthetic rubber such as polyisoprene rubber, styrene-butadiene rubber, ethylene-propylenediene rubber, acrylonitryl-butadiene rubber and silicone rubber are colored with a coloring agent such as a known iron oxide pigment and widely used as a molding material.

Thermoplastic resins, even if they are not colored with an iron oxide pigment, are decomposed and degenerated by the heat applied thereto during processing or the sun light striking them during exposure to the open air after they are molded into products. If a coloring agent such as an iron oxide pigment is mixed with the rubber or thermoplastic resin, the deterioration of the rubber or the thermoplastic resin is greatly accelerated due to the heat-deterioration acceleration of the coloring agent or the change acceleration of a weather-resistant material.

Such deterioration is remarkable in a resin containing chlorine such as polyvinyl chloride, chlorinated polyethylene, chlorinated polypropylene and polyvinylidene chloride. Especially, this is a great problem in polyvinyl chloride which is generally used.

The deterioration of rubber of a resin will be explained in the following while citing a polyvinyl chloride resin which is typical of chlorine-containing resins.

Such deterioration is generated because a part of chlorine bonding in a polyvinyl chloride resin is decomposed by heat at 100° to 200° C. or by light and produces hydrogen chloride, thereby forming a polyene structure having a double bonding. Further hydrogen chloride produced secondarily acts on the resin itself, thereby cutting a part of C—C bonding of a polymer or giving rise to a cross-linking reaction as a chain reaction.

It is generally known that in order to suppress such deterioration, a neutralizer such as a lead compound and metallic soap for neutralizing hydrogen chloride produced by decomposition or a resin stabilizer such as an organic tin compound and an epoxy compound which is effective for suppressing the generation of a double bonding, is added to a polyvinyl chloride resin for an ordinary thermoforming material even when no iron oxide pigment is used.

As a coloring agent for a polyvinyl chloride resin, iron oxide pigments as inorganic pigments having excellent heat resistance and weather resistance, are conventionally widely used. As is known, since metals such as Mn, Fe, Co, Ni, Cu and Zn accelerates dehydroclorination, when an iron oxide pigment is mixed with a polyvinyl chloride resin as a coloring agent, the deterioration of the resin is greatly accelerated.

An iron oxide pigment which shows excellent deterioration resistance is therefore strongly demanded.

Various Methods of improving the deterioration resistance of an iron oxide pigment have conventionally been investigated. For example, a method of forming a continuous fine silica coating film on the surfaces of iron oxide particles (Japanese Patent Publication (KOKOKU) No. 54-7292 (1979)), a method of coating the surfaces of the iron oxide particles with glass-like Na- and/or K-Si materials (Japanese Patent Publication (KOKOKU) No. 53-11537 (1978)), and a method of precipitating $SiO_2$ on the surfaces of the iron oxide particles and further precipitating aluminum hydroxide on the precipitated $SiO_2$ (Japanese Patent Application Laid-Open (KOKAI) No. 53-36538 (1978)) are known.

Although an iron oxide pigment which shows excellent deterioration resistance is now in the strongest demand, the above-described known iron oxide pigments cannot be said to have a sufficient deterioration resistance, as will be shown in a later-described comparative examples.

On the other hand, magnetite particles which contain a silicon component therewithin and also have a silicon component exposed to the surfaces, and which have a small residual magnetization, high electric resistance, and excellent operability and fluidity are proposed in Japanese Patent Application Laid-Open (KOKAI) No. 5-213620 (1993). The object of the invention of Japanese Patent Application Laid-Open (KOKAI) No. 5-213620 (1993) is to provide magnetite particles for a magnetic toner for an electrostatic copying machine, and the specification thereof is completely silent about an iron oxide pigment which is capable of suppressing the deterioration such as decomposition and degeneration of a rubber or thermoplastic resin, that is, which shows excellent deterioration resistance. The specification is also completely silent about rubber or resin composition which is composed of the iron oxide pigment and a rubber or thermoplastic resin and which shows excellent deterioration resistance.

Accordingly, it is a technical problem to be solved in the present invention to improve the deterioration resistance of a rubber or resin composition containing an iron oxide pigment, that cannot be realized or expected in the prior art.

As a result of studies undertaken by the present inventors, it has been found that by adding to 90 to 99.9 parts by weight of rubber or thermoplastic resin to 0.1 to 10.0 parts by weight of specific iron oxide particles composed of iron oxide core which contains 0.21 to 2.14 wt % of silicon (calculated as $SiO_2$) and a precipitate composed of silicon of 0.01 to 10.0 wt % (calculated as $SiO_2$) which adheres to the surfaces of the iron oxide core, and having a sphere ratio (maximum diameter/minimum diameter) of 0.7, the obtained rubber or resin composition has, when heated at 190° C. for 90 minutes, an area percentage of the part the color of which is changed of not more than 25%, that is, such rubber or resin composition has excellent deterioration resistance. The present invention has been achieved on the basis of this finding.

SUMMARY OF THE INVENTION

Accordingly, it is an object of the present invention to provide a rubber or resin composition with the deterioration effectively suppressed.

To achieve this aim, in a first aspect of the present invention, there is provided a rubber or resin composition comprising:

0.1 to 10.0 parts by weight of iron oxide particles composed of iron oxide core which contains 0.21 to 2.14 wt % of silicon (calculated as $SiO_2$) and a precipitate composed of silicon of 0.01 to 10.0 wt % (calculated as $SiO_2$), which adheres to the surfaces of said iron oxide core, a sphere ratio (maximum diameter/minimum diameter) of said iron oxide particles being of 0.7 to 1.0, an average particle diameter of said iron oxide particles being 0.05 to 1.0 μm, a geometric standard deviation σg of said iron oxide particles which shows the particle size distribution being not more than 1.40, a bulk density of said iron oxide particles being 0.80 to 1.5 g/cm$^3$, and a surface activity of said iron oxide particles which is indicated by the number of cyclohexanone molecules adsorbed to the surfaces of the iron oxide particles (number of molecules/nm$^2$) being not more than 1.70; and 90 to 99.9 parts by weight of a rubber or thermoplastic resin.

In a second aspect of the present invention, there is provided a rubber or resin composition comprising:

0.1 to 10.0 parts by weight of iron oxide particles composed of iron oxide core which contains 0.21 to 2.14 wt % of silicon (calculated as $SiO_2$) and a coprecipitate composed of silicon of 0.01 to 10.0 wt % (calculated as $SiO_2$) and at least one element selected from the group consisting of Al, Zr, Sn and Ti of 0.01 to 20.0 wt % (calculated as Al, Zr, Sn or Ti), which adheres to the surfaces of said iron oxide core, wherein the total amount of silicon and at least one element selected from the group consisting of Al, Zr, Sn and Ti is 0.02 to 20 wt % (calculated as $SiO_2$, Al, Zr, Sn or Ti) and the ratio of Si to at least one element selected from the group consisting of Al, Zr, Sn and Ti in said coprecipitate is 0.01:1 to 100:1, a sphere ratio (maximum diameter/minimum diameter) of said iron oxide particles being of 0.7 to 1.0, an average particle diameter of said iron oxide particles being 0.05 to 1.0 μm, a geometric standard deviation σg of said iron oxide particles which shows the particle size distribution being not more than 1.40, a bulk density of said iron oxide particles being 0.80 to 1.5 g/cm$^3$, and a surface activity of said iron oxide particles which is indicated by the number of cyclohexanone molecules adsorbed to the surfaces of the iron oxide particles (number of molecules/nm$^2$) being not more than 1.70; and 90 to 99.9 parts by weight of rubber or thermoplastic resin.

In the third aspect of the present invention, there is provided iron oxide particles comprising iron oxide core which contains 0.21 to 2.14 wt % of silicon (calculated as $SiO_2$); and a precipitate composed of silicon of 0.01 to 10.0 wt % (calculated as $SiO_2$), which adheres to the surfaces of said iron oxide core, a sphere ratio (maximum diameter/minimum diameter) of said iron oxide particles being of 0.7 to 1.0, an average particle diameter of said iron oxide particles being 0.05 to 1.0 μm, a geometric standard deviation σg of said iron oxide particles which shows the particle size distribution being not more than 1.40, a bulk density of said iron oxide particles being 0.80 to 1.5 g/cm$^3$, a surface activity of said iron oxide particles which is indicated by the number of cyclohexanone molecules adsorbed to the surfaces of the iron oxide particles (number of molecules/nm$^2$) being not more than 1.70, a BET specific surface area of the particles being 5 to 15 m$^2$/g, and an oil absorption measured in accordance with JIS X5101 being 16 to 22 ml/100 g.

In a fourth aspect of the present invention, there is provided iron oxide particles comprising iron oxide core which contains 0.21 to 2.14 wt % of silicon (calculated as $SiO_2$); and a coprecipitate composed of silicon of 0.01 to 10.0 wt % (calculated as $SiO_2$) and at least one element selected from the group consisting of Al, Zr, Sn and Ti of 0.01 to 20.0 wt % (calculated as Al, Zr, Sn or Ti), which adheres to the surfaces of said iron oxide core, wherein the total amount of silicon and at least one element selected from the group consisting of Al, Zr, Sn and Ti is 0.02 to 20 wt % (calculated as $SiO_2$, Al, Zr, Sn or Ti) and the ratio of Si to at least one element selected from the group consisting of Al, Zr, Sn and Ti in said coprecipitate is 0.01:1 to 100:1, a sphere ratio (maximum diameter/minimum diameter) of said iron oxide particles being of 0.7 to 1.0, an average particle diameter of said iron oxide particles being 0.05 to 1.0 μm, a geometric standard deviation σg of said iron oxide particles which shows the particle size distribution being not more than 1.40, a bulk density of said iron oxide particles being 0.80 to 1.5 g/cm$^3$, a surface activity of said iron oxide particles which is indicated by the number of cyclohexanone molecules adsorbed to the surfaces of the iron oxide particles (number of molecules/nm$^2$) being not more than 1.70, a BET specific surface area of the particles being 5 to 40 m$^2$/g, and an oil absorption measured in accordance with JIS X5101 being 18 to 40 ml/100 g.

DETAILED DESCRIPTION OF THE INVENTION

Thermoplastic resins usable in the present invention are polyvinyl chloride resin, polyester resin, polypropylene resin, polyethylene resin, polyamide resin, polycarbonate resin, ABS resin (acrylonitrile-butadiene-styrene copolymer), etc. The thermoplastic resins may be used in the form of powder, beads or pellets, but from the point of view of kneadability with iron oxide particles, the thermoplastic resins may be preferably used in the form of powder. The polyvinyl chloride resin, polyethylene resin, polyamide resin and ABS resin are preferred.

Rubber usable in the present invention is natural rubber, polyisoprene rubber, styrene-butadiene rubber, ethylene-propylenediene rubber, acrylonitryl-butadiene rubber, silicon rubber or the like.

Iron oxide particles in the present invention are spherical particles with silicon contained therewithin and a silicon precipitate or a coprecipitate of silicon and at least one element selected from the group consisting of Al, Zr, Sn and Ti adhered to the particle surfaces.

As to the sphericity (spherical ratio) of the spherical iron oxide particles, the ratio of the minimum diameter to the maximum diameter is 0.7 to 1.0, preferably 0.8 to 1.0, and the average particle diameter of the iron oxide particles is 0.05 to 1.0 μm, preferably 0.1 to 0.5 μm.

If the sphericity is less than 0.7, it is difficult to disperse the iron oxide particles into the rubber or thermoplastic resin.

If the average particle diameter is less than 0.05 μm, it is difficult to disperse the iron oxide particles into the rubber or thermoplastic resin. On the other hand, if the particle diameter exceeds 1.0 μm, although the dispersibility is good, when the rubber or the resin composition is processed into film or a sheet, the processability is lowered.

The particle size distribution of the iron oxide particles is preferably as sharp as possible. The geometric standard deviation σg of the particle size distribution of the iron oxide particles is not more than 1.40, preferably not more than 1.35, and the lower limit thereof is 1.0 under the consideration of the particle size distribution of the spherical iron oxide particles obtained. If the geometric standard deviation σg exceeds 1.40, the ratio in which coarse particles exist increases, and when these particles are processed into film or a sheet, the processability is lowered.

The higher the sphericity, the larger the bulk density tends to be. The bulk density is 0.80 to 1.50 g/cm$^3$, preferably 0.90 to 1.20 g/cm$^3$. A bulk density of less than 0.80 g/cm$^3$ is not favorable, because since the amount of air contained in the powder is too much, the deairation is insufficient or it takes a longer time than necessary at the time of dispersing the particles into rubber or resin composition. When the bulk density exceeds 1.50 g/cm$^3$, since the specific gravity thereof is too widely different from that of the rubber or the thermoplastic resin, the particles are sometimes not well mixed with the rubber or the thermoplastic resin.

As the iron oxide particles used in the present invention, reddish brown~reddish purple hematite particles ($\alpha$-Fe$_2$O$_3$), gray~black magnetite particles (FeO$_x$·Fe$_2$O$_3$, 0<x≦1), brown~reddish brown maghemite particles ($\gamma$-Fe$_2$O$_3$) are usable, and the shape of the particles may be any of sphere, octahedron, hexahedron, spindle and acicular (needle).

The silicon contained in the iron oxide particles in the present invention is 0.21 to 2.14 wt %, preferably 0.30 to 2.00 wt % (calculated as SiO$_2$). If the silicon content is less than 0.21 wt %, it is not favorable because it is difficult to obtain a high sphericity and to precipitate SiO$_2$ on the surfaces of the particles. If the silicon content exceeds 2.14 wt %, although a sufficient sphericity is obtained and it is possible to sufficiently precipitate SiO$_2$ on the particle surfaces, since the effect thereof is saturated, it is meaningless that the particles contain silicon more than necessary.

The silicon precipitated on the particle surfaces is in the form of an oxide or a hydroxide of silicon, and the amount of silicon is 0.01 to 10.0 wt %, preferably 0.05 to 5.0 wt % (calculated as SiO$_2$). If the content of precipitated silicon is less than 0.01 wt %, it is difficult to suppress the surface activity of the iron oxide particles. On the other hand, if it exceeds 10.0 wt % although it is possible to suppress the surface activity of the iron oxide particles, since the effect thereof is saturated, it is meaningless to coat the particles with silicon more than necessary.

At least one element selected from the group consisting of Al, Zr, Sn and Ti which coprecipitates with Si on the surfaces of the particles in the present invention is in the form of an oxide or a hydroxide, and the amount thereof is 0.01 to 20.0 wt %, preferably 0.05 to 20.0 wt % (calculated as Al, Zr, Sn or Ti). If the amount is less than 0.01 wt %, it may be difficult to more effectively suppress the activity of the surfaces of the iron oxide particles. If the amount exceeds 20.0 wt %, although it is possible to effectively suppress the activity of the surfaces of the iron oxide particles, since the effect thereof is saturated, it is meaningless to coat the particles more than necessary.

The total amount of Si and at least one element selected from the group consisting of Al, Zr, Sn and Ti is preferably 0.05 to 20.0 wt %, more preferably 0.1 to 20.0 wt % the from the point of view of more effective suppression of the deterioration of the rubber or the thermoplastic resin.

The ratio of Si to an element (elements) other than Si in the coprecipitate in the present invention is 0.01:1 to 100:1. If the said ratio of Si is less than 0.01:1, it is difficult to more effectively suppress the deterioration of the rubber or the thermoplastic resin. The preferable ratio is 0.05:1 to 30:1, more preferably 0.05:1 to 10:1.

Spherical magnetite particles with silicon contained therewithin and a silicon precipitate adhered to the particle surfaces according to the present invention are obtained by:

(i) adding 0.4 to 4.0 mol % of water-soluble silicate (calculated as Si) based on Fe, to either an alkali hydroxide solution or an aqueous ferrous salt reaction solution containing a ferrous hydroxide colloid which is obtained by reacting an aqueous ferrous salt solution with 0.90 to 0.99 equivalent of the alkali hydroxide based on the Fe$^{2+}$ in the aqueous ferrous salt solution;

(ii) blowing an oxygen-containing gas into the aqueous ferrous salt reaction solution containing the ferrous hydroxide colloid while heating the aqueous ferrous salt reaction solution in the temperature range of 85° to 100° C. so as to produce magnetite particles containing silicon from the ferrous hydroxide colloid by oxidization reaction;

(iii) adding to the resultant solution not less than 1.00 equivalent of an aqueous alkali hydroxide solution based on the Fe$^{2+}$ remaining in the suspension after the oxidization reaction and continuing the oxidization reaction while heating the suspension in the temperature range of 85° to 100° C. so as to produce spherical magnetite particles containing silicon;

(iv) adjusting the pH of the resultant alkali suspension containing the spherical magnetite particles and the remaining Si which is in the process of producing the spherical magnetite particles containing silicon to 5 to 9 so as to precipitate the remaining Si on the surfaces of the spherical magnetite particles containing silicon; and (v) filtering out the particles, washing the particles with water and drying the particles.

According to this process, since silicon is contained within the spherical magnetite particles, the precipitate is easy to conform with the magnetite particles, and firmly deposits and adheres on and to the particle surfaces, so that the precipitate is unlikely to peel off.

Spherical magnetite particles with silicon contained therewithin and a coprecipitate of Si with at least one element selected from the group consisting of Al, Zr, Sn and Ti adhered to the particle surfaces according to the present invention are obtained by:

(i) adding at least one selected from the group consisting of water-soluble aluminum salt, water-soluble zirconium salt, water-soluble tin salt and water-soluble titanium salt to the said alkali suspension containing the spherical magnetite particles and the remaining Si which is in the process of producing spherical magnetite particles containing silicon in the above-described process, so that the salt added is 0.01 to 20 wt % (calculated as the corresponding element) based on the particles produced; and adjusting the pH to 5 to 7.

Especially, in the case of adding aluminum, since aluminum is more conformable with Fe than Si, and easily deposits and adheres on and to the surfaces of the magnetite particles, the coprecipitate adheres to the particle surfaces more firmly. This process is therefore more preferable.

The spherical magnetite particles with silicon and the like precipitated on the particle surfaces contain 0.21 to 2.14 wt % of silicon (calculated as $SiO_2$) based on the particles, within the particles, and also have 0.01 to 10.0 wt % of silicon (calculated as $SiO_2$) based on the particles adhered to the particle surfaces. If the precipitate is a coprecipitate of Si with at least one element selected from the group consisting of Al, Zr, Sn and Ti, 0.01 to 10.0 wt % of silicon (calculated as $SiO_2$) based on the particles and 0.01 to 20.0 wt % of at least one element selected from the group consisting of Al, Zr, Sn and Ti (calculated as the corresponding element) based on the particles, adhere to the particle surfaces.

Spherical maghemite particles are obtained by heating spherical magnetite particles with silicon contained therewithin and a silicon precipitate or a coprecipitate of Si with at least one element selected from the group consisting of Al, Zr, Sn and Ti adhered to the particle surfaces, to 300° to 350° C. in the air.

Spherical hematite particles are obtained by heating the spherical magnetite particles obtained in the above process to 450° to 800° C. in the air.

In the thus-obtained spherical maghemite particles and spherical hematite particles with silicon contained therewithin and a silicon precipitate or a coprecipitate of Si with at least one element selected from the group consisting of Al, Zr, Sn and Ti adhered to the particle surfaces, the precipitate is also prevented from peeling off. The amount of silicon contained within the particles and the amount of silicon and at least one element selected from the group consisting of Al, Zr, Sn and Ti which adhere to the particle surfaces in the spherical maghemite particles or spherical hematite particles are approximately the same with those in the spherical magnetite particles.

As the compounds of the respective elements of Si, Al, Zr, Sn and Ti, the following compounds are usable.

As a silicon compound are usable sodium orthosilicate, sodium metasilicate, sodium disilicate, water glass No. 3, colloidal silica, etc.

As an aluminum compound are usable an alkali aluminate such as sodium aluminate, aluminum sulfate, aluminum acetate, aluminum nitrate, aluminum chloride, alumina sol, etc.

As a tin compound are usable an alkali compound such as sodium stannate, tin sulfate, tin chloride, tin oxide sol, etc.

As a zirconium compound are usable zirconium sulfate, zirconium nitrate, zirconium acetate, zirconia sol, etc.

As a titanium compound, titanyl sulfate, titania sol, etc. are usable.

The amount of the spherical iron oxide particles with silicon contained therewithin and a silicon precipitate or a coprecipitate composed of silicon and at least one element selected from the group consisting of Al, Zr, Sn and Ti adhered to the particle surfaces is 0.1 to 10.0 parts by weight, preferably 0.5 to 5.0 parts by weight based on 100 parts by weight of the rubber or resin composition. The amount of the rubber or thermoplastic resin is 90.0 to 99.9 parts by weight, preferably 95.0 to 99.5 parts by weight based on 100 parts by weight of the rubber or resin composition.

When the amount of the rubber or thermoplastic resin is less than 90.0 parts by weight, it is difficult to suppress the deterioration of the rubber or the thermoplastic resin. On the other hand, when the amount of the rubber or the thermoplastic resin exceeds 99.9 parts by weight, it is difficult to adequately color the rubber or the thermoplastic resin.

When the amount of the iron oxide particles are less than 0.1 part by weight, it is difficult to adequately color the rubber or the thermoplastic resin. If the amount of the iron oxide particles exceed 10.0 parts by weight, it is difficult to suppress the deterioration of the rubber or the resin.

The rubber or the resin composition according to the present invention is obtained by mixing iron oxide particles with rubber or resin material, crushing the aggregates of the iron oxide particles with a strong shearing force of a kneading machine or an extruder under heating, and uniformly dispersing the iron oxide particles in the rubber or the resin material. The thus-obtained rubber or resin composition is molded into a shape suitable.

The rubber or resin composition composed of the iron oxide particles and the rubber or a thermostatic resin according to the present invention may contain an additive such as lubricant, plasticizer, antioxidant, ultraviolet absorber, and stabilizer.

The amount of the additive is not more than 50 wt % based on the total amount of the iron oxide particles and the rubber or thermoplastic resin. If the amount of additive exceeds 50 wt %, the moldability is lowered.

The most important point in the present invention is the fact that when spherical iron oxide particles with silicon contained therewithin and a silicon precipitate adhered to the particle surfaces are used as a coloring agent for rubber or thermoplastic resin, it is possible to effectively suppress the deterioration of the rubber or the thermoplastic resin.

In the present invention, when spherical iron oxide particles with silicon contained therewithin and a coprecipitate composed of silicon with at least one element selected from the group consisting of Al, Zr, Sn and Ti adhered to the particle surfaces are used as a coloring agent for rubber or thermoplastic resin, it is possible to more effectively suppress the deterioration of the rubber or thermoplastic resin.

The reason why the deterioration of the rubber or thermoplastic resin can be effectively suppressed in the present invention is considered by the present inventors to be as follows. As shown in later-described comparative examples, (1) when spherical iron oxide particles containing silicon only within the particles without any silicon precipitate on the particle surfaces are used, (2) when spherical iron oxide particles coated with a silicon precipitate but containing no silicon within the particles are used, or (3) when cubic (or granular) iron oxide particles with silicon contained therewithin and with the surfaces coated with a silicon precipitate are used, it is impossible to effectively suppress the deterioration of the rubber or thermoplastic resin. From this fact, it is considered that the deterioration of the rubber or the thermoplastic resin is effectively suppressed in the present invention due to the synergistic effect of the shape of the particles, the presence of silicon within the particles and the state of presence of silicon on the particle surfaces.

To describe this in more detail, due to the spherical shape of the iron oxide particles, the BET specific surface area of the particles is small, which leads to a comparatively small surface activity. In addition, since the precipitate firmly adheres to the particle surfaces, it does not peel off and the contact with the rubber or the thermoplastic resin is effectively prevented.

The surface activity of the iron oxide particles of the present invention, which is indicated by the number of cyclohexanone molecules adsorbed to the surfaces of the iron oxide particles (number of molecules/$nm^2$) is not more than 1.70. In case of the precipitate composed of silicon, the surface activity (number of molecules/$nm^2$) of 0.8 to 1.6 is preferred. In case of the precipitate composed of silicon and at least one element selected from the group consisting of Al, Zr, Sn and Ti, the surface activity (number of molecules/$nm^2$) of 0.2 to 1.6 is preferred. The BET specific surface area of the particles is 5 to 15 $m^2/g$, in case of the precipitate composed of silicon. The BET specific surface area of the particles is 5 to 40 m²/g, in case of the precipitate composed of silicon and at least one element selected from the group consisting of Al, Zr, Sn and Ti. The oil absorption thereof measured in accordance with JIS X5101 is 16 to 22 ml/100 g, preferably 16 to 20 ml/100 g, in case of the precipitate composed of silicon. The oil absorption thereof measured in accordance with JIS X5101 is 18 to 40 ml/100 g, preferably 18 to 30 ml/100 g, in case of the precipitate composed of silicon and at least one element selected from the group consisting of Al, Zr, Sn and Ti.

When the rubber or thermoplastic resin composition of the present invention is heated at 190° C. for 90 minutes, the area percentage of the part the color of which changes is not more than 25%, preferably not more than 20%. That is, the deterioration of the rubber or the thermoplastic resin is greatly suppressed.

The rubber or resin composition of the present invention is used as a materiel of a film, sheet, plate, fiber, etc. for insulating materials, medical articles, industrial materials, electrical equipment parts, tablewares, and mechanical parts.

Since the surface activity of the iron oxide particles of the present invention is sufficiently suppressed, the deterioration of the rubber or the thermoplastic resin mixed with the iron oxide particles is sufficiently suppressed.

EXAMPLES

The present invention will now be described in more detail with reference to the following examples and comparative examples.

The shape and the sphericity (sphere ratio) of the iron oxide particles in each of the examples and comparative examples are indicated by the averages of the measured values of 350 particles observed through a transmission electron microscope and a scanning electron microscope.

The particle size distribution of the particles is expressed by the geometrical standard deviation ($\sigma g$) obtained by the following method. The diameters of 350 particles in an electron microphotograph (120,000 magnification) were measured. The actual diameters of the particles and the number were obtained from the calculation on the basis of the measured values. On logarithmico-normal probability paper, the particle diameters are plotted at regular intervals on the abscissa-axis, and the accumulative number of particles belonging to each interval of the particle diameters was plotted by percentage on the ordinate-axis by a statistical technique. The particle diameters corresponding to the number of particles of 50% and 84.13%, respectively, were read from the graph, and the geometrical standard deviation ($\sigma g$) was measured from the following formula:

Geometrical standard deviation ($\sigma g$)=Particle diameter (μm) corresponding to the number of particles of 84.13%/Major axial diameter (μm) corresponding to the number of particles of 50%.

The Si content, Al content, Zr content, Sn content and Ti content in the iron oxide particles were measured in accordance with the general rule of fluorescent X-ray analysis, JIS K0119 by "Fluorescent X-ray analyzer Model 3063M" (manufactured by Rigaku Denki Kogyo Co., Ltd.).

The surface activity of the iron oxide particles was obtained by measuring the number of cyclohexanone molecules adsorbed to the surfaces of the iron oxide particles (number of molecules/nm²) in the following process. The smaller the number of cyclohexanone molecules adsorbed, the smaller the surface activity of the iron oxide particles. There is high correlation between the surface activity of the iron oxide particles evaluated by the number of cyclohexanone molecules adsorbed and the evaluation of the deterioration of the resin which will be described later.

(1) The iron oxide particles were dried at 60° C. for 1 hour.

(2) 2 g of the dried iron oxide particles were charged into an aluminum pan having a diameter of 7 cm, and 10 g of cyclohexanone was poured thereon.

(3) The contents were lightly stirred, so that the iron oxide particles were adequately dipped into cyclohexanone, and the aluminum pan was left to stand for 3 hours in draft.

(4) The aluminum pan was put into a dry oven and heated at 60° C. for 24 hours.

(5) The carbon contents in the iron oxide particles before and after they were treated with cyclohexanone were measured by HORIBA CARBON/SULFUR ANALYZER EMIA-2000.

(6) The number of cyclohexanone molecules adsorbed to the surfaces of the iron oxide particles (number of molecules/nm²) was obtained from the increased carbon content.

The degree of deterioration of the resin was evaluated as follows. A colored resin plate (1.5 cm long×1.5 cm wide×1 mm thick) was heated to 190° C., and the ratio ($S/S_0$) of the area (S) of the part of the resin which was deteriorated and the color of which changed to the area ($S_0$) of the colored plate before heating was quantitatively determined at regular intervals of 5%. If ($S/S_0$)×100 is 0%, it means that there is no deterioration, while if ($S/S_0$)×100 is 100%, it means that the rubber or resin composition has been completely deteriorated. The percentage of the degree of deterioration [($S/S_0$)×100] is required to have not more than 25%.

PRODUCTION OF IRON OXIDE PARTICLES

To 30.0 litres of a 1.90 mol/l NaOH solution containing 2,810 g of sodium silicate (#3) ($SiO_2$:28.6 wt %), 20.0 litres of a 1.5N ferrous sulfate solution was added to obtain an aqueous ferrous sulfate solution including $Fe(OH)_2$. The alkali to iron ratio (2OH/Fe) in this solution was 0.95, and the concentration of $Fe^{2+}$ (including $Fe(OH)_2$) was 0.6 mol/l. Air was passed at a rate of 95 litre/min, through the ferrous sulfate solution containing $Fe(OH)_2$ at 90° C. for 120 minutes to carry out the reaction for forming an aqueous solution containing the magnetite particles.

Then 1.46 litres of 6.5N NaOH solution (corresponding to 1.10 equivalent to $Fe^{2+}$) was added and air was passed through the solution at a rate of 100 litre/min at 90° C. for 60 minutes to carry out the reaction for forming the magnetite particles. A part of the alkaline suspension containing the magnetite particles was collected and analyzed by a plasma emission spectroscopic analyzer to confirm the presence of Si in the suspension.

3N dilute sulfuric acid was added to the suspension to adjust its pH to 6.5. The resultantly formed black precipitate was filtered, washed with water and dried in the usual ways to obtain the black particles.

Various kinds (1) to (22) of iron oxide particles were prepared and their properties are shown in Tables 1 to 3. The neutralization method in the surface treatment of the iron oxide particles (18) to (22) is a method of charging a surface-treating material liquid into the iron oxide slurry being treated, neutralizing the liquid with an acid or an alkali and coating the surfaces of the iron oxide particles. The coprecipitation method is a method of simultaneously using at least two surface-treating material liquids, neutralizing, if necessary, the liquids and coating the surfaces of the iron oxide particles with a coprecipitate.

Production of rubber or resin composition

Examples 1 to 18

Comparative Examples 1 to 6

Example 1

1.5 g of iron oxide particles (1) and 48.5 g of polyvinyl chloride resin powder 103EP8D (produced by Nippon Zeon Co., Ltd.) were each weighed, and adequately mixed with a spatula in a 100-cc polyethylene beaker, thereby obtaining mixed powder.

0.5 g of calcium stearate was mixed with the mixed powder. The thus-obtained mixed powder was gradually kneaded by roller mill which was heated to 160° C. and the clearance was set at 0.2 mm. The kneading operation was continued until the resin composition became solid. The resin composition was then removed from the rollers. The resin composition was used as a material of a colored resin plate.

After the resin composition was inserted into stainless steel plates with the surfaces polished, it was charged into a hot press which was heated to 180° C. The resin composition was press-molded under a pressure of 1 ton/cm$^2$ to obtain a colored resin plate of 1 mm thick.

Test pieces of 1.5 cm square were cut out of the colored resin plate, and three test pieces were charge into a Geer oven which was heated to 190° C. One piece was taken out at intervals of 30 minutes so as to examine the deterioration of the resin. The results are shown in Table 4. As is clear from Table 4, the deterioration of the resin was sufficiently adequately suppressed.

Examples 2 to 18, Comparative Examples 1 to 6

Colored plates were produced in the same way as in Example 1 except for varying the kind of iron oxide particles. Three test pieces of 1.5 cm square were cut out of each of the colored resin plates so as to examine the deterioration of the resins. The results are shown in Tables 4 to 6. The deterioration was sufficiently suppressed in the resin compositions obtained in Examples 2 to 18.

TABLE 1

| Kind of iron oxide particles | Spherical iron oxide particles | | |
|---|---|---|---|
| | Kind | Sphericity | Amount of silicon contained within particles Calculated as SiO$_2$ (wt %) |
| Iron oxide particles (1) | Spherical magnetite particles | 0.94 | 0.73 |
| Iron oxide particles (2) | Spherical magnetite particles | 0.94 | 0.73 |
| Iron oxide particles (3) | Spherical magnetite particles | 0.89 | 0.75 |
| Iron oxide particles (4) | Spherical magnetite particles | 0.90 | 0.71 |
| Iron oxide particles (5) | Spherical magnetite particles | 0.96 | 0.69 |
| Iron oxide particles (6) | Spherical magnetite particles | 0.93 | 0.70 |
| Iron oxide particles (7) | Spherical magnetite particles | 0.94 | 0.73 |
| Iron oxide particles (8) | Spherical magnetite particles | 0.95 | 0.70 |

TABLE 1-continued

| Kind of iron oxide particles | Spherical iron oxide particles Precipitate on the surfaces | | Spherical surface-coated iron oxide particles |
|---|---|---|---|
| | Kind | Calculated as: Amount (wt %) | Average particle diameter (μm) |
| Iron oxide particles (1) | Oxide of silicon | SiO$_2$: 0.18 | 0.22 |
| Iron oxide particles (2) | Oxide of silicon Hydroxide of Al | SiO$_2$: 0.18 Al: 0.25 | 0.22 |
| Iron oxide particles (3) | Oxide of silicon Hydroxide of Sn | SiO$_2$: 0.22 Sn: 1.78 | 0.25 |
| Iron oxide particles (4) | Oxide of silicon Hydroxide of Ti | SiO$_2$: 0.20 Ti: 0.51 | 0.24 |
| Iron oxide particles (5) | Oxide of silicon Hydroxide of Zr | SiO$_2$: 0.16 Zr: 1.06 | 0.20 |
| Iron oxide particles (6) | Oxide of silicon | SiO$_2$: 0.91 | 0.22 |
| Iron oxide particles (7) | Oxide of silicon Hydroxide of Al | SiO$_2$: 0.87 Al: 1.15 | 0.22 |
| Iron oxide particles (8) | Oxide of silicon Hydroxide of Al Hydroxide of Zr | SiO$_2$: 0.18 Al: 1.56 Zr: 0.52 | 0.23 |

| Kind of iron oxide particles | Spherical surface-coated iron oxide particles | | | | |
|---|---|---|---|---|---|
| | Particle size distribution σg (−) | Bulk density (g/cm$^3$) | Surface activity | BET specific surface area (m$^2$/g) | Oil absorption (ml/100 g) |
| Iron oxide particles (1) | 1.23 | 0.95 | 1.61 | 9.5 | 17 |
| Iron oxide particles (2) | 1.23 | 0.96 | 1.50 | 10.1 | 22 |
| Iron oxide particles (3) | 1.30 | 0.93 | 1.36 | 7.8 | 18 |
| Iron oxide particles (4) | 1.30 | 1.00 | 1.42 | 8.1 | 20 |
| Iron oxide particles (5) | 1.18 | 0.96 | 1.38 | 12.8 | 20 |
| Iron oxide particles (6) | 1.21 | 0.98 | 1.29 | 7.3 | 20 |
| Iron oxide particles (7) | 1.22 | 0.92 | 1.15 | 15.6 | 26 |
| Iron oxide particles (8) | 1.25 | 0.90 | 1.18 | 17.9 | 28 |

TABLE 2

| Kind of iron oxide particles | Spherical iron oxide particles | | | |
|---|---|---|---|---|
| | Production process | Kind | Sphericity | Amount of silicon contained within particles (Calculated as SiO$_2$) (wt %) |
| Iron oxide particles (9) | Heat iron oxide particles (1) at 800° C. in air | Spherical hematite particles | 0.94 | 0.73 |
| Iron oxide particles (10) | Heat iron oxide particles (2) at 800° C. in air | Spherical hematite particles | 0.94 | 0.73 |
| Iron oxide particles (11) | Heat iron oxide particles (3) at 850° C. in air | Spherical hematite particles | 0.89 | 0.73 |
| Iron oxide particles | Heat iron oxide particles (4) | Spherical hematite | 0.89 | 0.70 |

TABLE 2-continued

| Kind of iron oxide particles | | | | |
|---|---|---|---|---|
| Iron oxide particles (12) | Heat iron oxide particles (5) at 850° C. in air | Spherical maghemite particles | 0.95 | 0.70 |
| Iron oxide particles (13) | Heat iron oxide particles (6) at 350° C. in air | Spherical maghemite particles | 0.93 | 0.71 |
| Iron oxide particles (14) | Heat iron oxide particles (7) at 350° C. in air | Spherical maghemite particles | 0.94 | 0.73 |
| Iron oxide particles (15) | Heat iron oxide particles (8) at 300° C. in air | Spherical maghemite particles | 0.95 | 0.71 |
| Iron oxide particles (16) | Heat iron oxide particles (8) at 300° C. in air | Spherical maghemite particles | 0.95 | 0.71 |

| Kind of iron oxide particles | Spherical iron oxide particles Precipitate on the surfaces | | Spherical surface-coated iron oxide particles |
|---|---|---|---|
| | Kind | Calculated as: Amount (wt %) | Average particle diameter (μm) |
| Iron oxide particles (9) | Oxide of silicon | $SiO_2$: 0.17 | 0.23 |
| Iron oxide particles (10) | Oxide of silicon Hydroxide of Al | $SiO_2$: 0.20 Al: 0.26 | 0.22 |
| Iron oxide particles (11) | Oxide of silicon Hydroxide of Sn | $SiO_2$: 0.18 Sn: 1.76 | 0.25 |
| Iron oxide particles (12) | Oxide of silicon Hydroxide of Ti | $SiO_2$: 0.21 Ti: 0.51 | 0.23 |
| Iron oxide particles (13) | Oxide of silicon Hydroxide of Zr | $SiO_2$: 0.20 Zr: 1.03 | 0.20 |
| Iron oxide particles (14) | Oxide of silicon | $SiO_2$: 0.89 | 0.22 |
| Iron oxide particles (15) | Oxide of silicon Hydroxide of Al | $SiO_2$: 0.87 Al: 1.12 | 0.22 |
| Iron oxide particles (16) | Oxide of silicon Hydroxide of Al Hydroxide of Zr | $SiO_2$: 0.19 Al: 1.50 Zr: 0.51 | 0.23 |

| Kind of iron oxide particles | Spherical surface-coated iron oxide particles | | | | |
|---|---|---|---|---|---|
| | Particle size distribution σg (−) | Bulk density (g/cm³) | Surface activity | BET specific surface area (m²/g) | Oil absorption (ml/100 g) |
| Iron oxide particles (9) | 1.25 | 0.98 | 1.58 | 6.8 | 17 |
| Iron oxide particles (10) | 1.23 | 1.00 | 1.38 | 7.8 | 19 |
| Iron oxide particles (11) | 1.31 | 1.03 | 1.28 | 9.1 | 21 |
| Iron oxide particles (12) | 1.30 | 1.10 | 1.36 | 9.5 | 21 |
| Iron oxide particles (13) | 1.18 | 1.00 | 1.40 | 14.5 | 20 |
| Iron oxide particles (14) | 1.24 | 1.06 | 1.25 | 8.3 | 18 |
| Iron oxide particles (15) | 1.24 | 0.99 | 1.00 | 18.1 | 25 |
| Iron oxide particles (16) | 1.25 | 0.97 | 1.06 | 19.6 | 27 |

TABLE 3

| Iron oxide particles | | | |
|---|---|---|---|
| Kind of iron oxide particles | Kind | Sphericity | Amount of silicon contained within particles Calculated as $SiO_2$ (wt %) |
| Iron oxide particles (17) | Spherical magnetite particles | 0.89 | 0.22 |
| Iron oxide particles (18) | Spherical magnetite particles | 0.70 | — |
| Iron oxide particles (19) | Cubic magnetite particles | 0.52 | 0.34 |
| Iron oxide particles (20) | Cubic hematite particles | 0.65 | — |
| Iron oxide particles (21) | Cubic maghemite particles | 0.67 | — |
| Iron oxide particles (22) | Acicular magnetite particles | aspect ratio: 8.0 | — |

| Kind of iron oxide particles | Spherical iron oxide particles Precipitate on the surfaces | | Surface treatment | | |
|---|---|---|---|---|---|
| | Kind | Calculated as: Amount (wt %) | Method | Kind | Calculated as: Amount (wt %) |
| Iron oxide particles (17) | — | — | — | — | — |
| Iron oxide particles (18) | — | — | Neutralization method | Oxide of silicon | $SiO_2$: 0.16 |
| Iron oxide particles (19) | — | — | Coprecipitation method | Oxide of silicon Hydroxide of Al | $SiO_2$: 0.21 Al: 1.76 |
| Iron oxide particles (20) | — | — | Neutralization method | Oxide of silicon | $SiO_2$: 0.005 |
| Iron oxide particles (21) | — | — | Neutralization method | Hydroxide of Al | Al: 0.01 |
| Iron oxide particles (22) | — | — | Neutralization method | Oxide of silicon | $SiO_2$: 0.13 |

| Iron oxide particles | | | | | |
|---|---|---|---|---|---|
| Kind of iron oxide particles | Average particle diameter (μm) | Particle size distribution σg (−) | Bulk density (g/cm³) | Surface activity | BET specific surface area (m²/g) | Oil absorption (ml/100 g) |
| Iron oxide particles (17) | 0.21 | 1.33 | 0.83 | 2.36 | 6.8 | 16 |
| Iron oxide particles (18) | 0.30 | 1.65 | 0.94 | 2.21 | 4.3 | 18 |
| Iron oxide particles (19) | 0.36 | 2.28 | 1.16 | 1.81 | 2.6 | 17 |
| Iron oxide particles (20) | 0.20 | 1.58 | 0.68 | 2.54 | 11.2 | 21 |

TABLE 3-continued

| | | | | | | |
|---|---|---|---|---|---|---|
| Iron oxide particles (21) | 0.22 | 1.41 | 0.66 | 2.31 | 10.8 | 22 |
| Iron oxide particles (22) | Major axial diameter: 0.35 | 1.48 | 0.43 | 2.21 | 31.5 | 36 |

TABLE 4

Production of rubber of thermoplastic resin composition

| | Iron oxide particles | | Rubber or thermoplastic resin | |
|---|---|---|---|---|
| | Kind | Amount (part by weight) | Kind | Amount (part by weight) |
| Example 1 | Iron oxide particles (1) | 3 | Polyvinyl chloride resin 103EP8D (Nippon Zeon Co., Ltd.) | 97 |
| Example 2 | Iron oxide particles (2) | 2 | Polyvinyl chloride resin 103EP8D (Nippon Zeon Co., Ltd.) | 98 |
| Example 3 | Iron oxide particles (3) | 5 | Polyvinyl chloride resin 103EP8D (Nippon Zeon Co., Ltd.) | 95 |
| Example 4 | Iron oxide particles (4) | 3 | Polyvinyl chloride resin 103EP8D Nippon Zeon Co., Ltd. | 97 |
| Example 5 | Iron oxide particles (5) | 1 | Polyvinyl chloride resin 103EP8D (Nippon Zeon Co., Ltd.) | 99 |
| Example 6 | Iron oxide particles (6) | 3 | Polyvinyl chloride resin 103EP8D (Nippon Zeon Co., Ltd.) | 97 |
| Example 7 | Iron oxide particles (7) | 3 | Polyvinyl chloride resin 103EP8D (Nippon Zeon Co., Ltd.) | 97 |
| Example 8 | Iron oxide particles (8) | 3 | Polyvinyl chloride resin 103EP8D (Nippon Zeon Co., Ltd.) | 97 |

| | Production of rubber of thermoplastic resin composition Additive | | Properties of rubber or thermoplastic resin composition Area ratio of the part the color of which change when heated at 190° C. $(S/S_0) \times 100$ (%) | | |
|---|---|---|---|---|---|
| | Kind | Amount (wt %) | 30 min | 60 min | 90 min |
| Example 1 | Calcium stearate | 1 | 0 | 5 | 10 |
| Example 2 | Calcium stearate | 1 | 0 | 0 | 5 |
| Example 3 | Calcium stearate | 1 | 0 | 5 | 10 |
| Example 4 | Calcium stearate | 1 | 0 | 5 | 5 |
| Example 5 | Calcium stearate | 1 | 0 | 0 | 5 |
| Example 6 | Calcium stearate | 1 | 0 | 0 | 5 |

TABLE 4-continued

| Example 7 | Calcium stearate | 1 | 0 | 0 | 0 |
|---|---|---|---|---|---|
| Example 8 | Calcium stearate | 1 | 0 | 0 | 0 |

TABLE 5

Production of rubber of thermoplastic resin composition

| | Iron oxide particles | | Rubber or thermoplastic resin | |
|---|---|---|---|---|
| | Kind | Amount (part by weight) | Kind | Amount (part by weight) |
| Example 9 | Iron oxide particles (9) | 5 | Polyvinyl chloride resin 103EP8D (Nippon Zeon Co., Ltd.) | 95 |
| Example 10 | Iron oxide particles (10) | 10 | Polyvinyl chloride resin 103EP8D (Nippon Zeon Co., Ltd.) | 90 |
| Example 11 | Iron oxide particles (11) | 3 | Polyvinyl chloride resin 103EP8D (Nippon Zeon Co., Ltd.) | 97 |
| Example 12 | Iron oxide particles (12) | 3 | Polyvinyl chloride resin 103EP8D (Nippon Zeon Co., Ltd.) | 97 |
| Example 13 | Iron oxide particles (13) | 2 | Polyvinyl chloride resin 103EP8D (Nippon Zeon Co., Ltd.) | 98 |
| Example 14 | Iron oxide particles (14) | 2 | Polyvinyl chloride resin 103EP8D (Nippon Zeon Co., Ltd.) | 98 |
| Example 15 | Iron oxide particles (15) | 2 | Polyvinyl chloride resin 103EP8D (Nippon Zeon Co., Ltd.) | 98 |
| Example 16 | Iron oxide particles (16) | 2 | Polyvinyl chloride resin 103EP8D (Nippon Zeon Co., Ltd.) | 98 |
| Example 17 | Iron oxide particles (7) | 2 | Polyethylene resin (MW = 28,000, density = 0.95) | 98 |
| Example 18 | Iron oxide particles (7) | 2 | ABS resin (MW = 33,000, density = 1.05) | 98 |

| | Production of rubber of thermoplastic resin composition Additive | | Properties of rubber or thermoplastic resin composition Area ratio of the part the color of which change when heated at 190° C. $(S/S_0) \times 100$ (%) | | |
|---|---|---|---|---|---|
| | Kind | Amount (wt %) | 30 min | 60 min | 90 min |
| Example 9 | Calcium stearate | 1 | 0 | 5 | 15 |
| Example 10 | Calcium stearate | 1 | 0 | 10 | 20 |
| Example 11 | Calcium stearate | 1 | 0 | 5 | 5 |
| Example 12 | Calcium stearate | 1 | 0 | 5 | 10 |
| Example 13 | Calcium stearate | 1 | 0 | 5 | 5 |
| Example 14 | Calcium stearate | 1 | 0 | 5 | 5 |
| Example 15 | Calcium stearate | 1 | 0 | 0 | 0 |
| Example 16 | Calcium stearate | 1 | 0 | 0 | 0 |

TABLE 5-continued

| | | | | | |
|---|---|---|---|---|---|
| Example 17 | Calcium stearate | 1 | 0 | 0 | 0 |
| Example 18 | Calcium stearate | 1 | 0 | 0 | 0 |

TABLE 6

Production of rubber of thermoplastic resin composition

| | Iron oxide particles | | Rubber or thermoplastic resin | |
|---|---|---|---|---|
| | Kind | Amount (part by weight) | Kind | Amount (part by weight) |
| Comp. Ex. 1 | Iron oxide particles (17) | 3 | Polyvinyl chloride resin 103EP8D (Nippon Zeon Co., Ltd.) | 97 |
| Comp. Ex. 2 | Iron oxide particles (18) | 3 | Polyvinyl chloride resin 103EP8D (Nippon Zeon Co., Ltd.) | 97 |
| Comp. Ex. 3 | Iron oxide particles (19) | 3 | Polyvinyl chloride resin 103EP8D (Nippon Zeon Co., Ltd.) | 97 |
| Comp. Ex. 4 | Iron oxide particles (20) | 3 | Polyvinyl chloride resin 103EP8D (Nippon Zeon Co., Ltd.) | 97 |
| Comp. Ex. 5 | Iron oxide particles (21) | 3 | Polyvinyl chloride resin 103EP8D (Nippon Zeon Co., Ltd.) | 97 |
| Comp. Ex. 6 | Iron oxide particles (22) | 3 | Polyvinyl chloride resin 103EP8D (Nippon Zeon Co., Ltd.) | 97 |

| | Production of rubber of thermoplastic resin composition Additive | | Properties of rubber or thermoplastic resin composition Area ratio of the part the color of which change when heated at 190° C. $(S/S_0) \times 100$ (%) | | |
|---|---|---|---|---|---|
| | Kind | Amount (wt %) | 30 min | 60 min | 90 min |
| Comp. Ex. 1 | Calcium stearate | 1 | 15 | 50 | 95 |
| Comp. Ex. 2 | Calcium stearate | 1 | 10 | 35 | 75 |
| Comp. Ex. 3 | Calcium stearate | 1 | 5 | 20 | 45 |
| Comp. Ex. 4 | Calcium stearate | 1 | 10 | 40 | 60 |
| Comp. Ex. 5 | Calcium stearate | 1 | 15 | 30 | 65 |
| Comp. Ex. 6 | Calcium stearate | 1 | 10 | 30 | 50 |

What is claimed is:

1. A rubber or resin composition comprising:
   0.1 to 10.0 parts by weight of iron oxide particles composed of an iron oxide core which contains 0.21 to 2.14 wt % $SiO_2$, and a precipitate composed of 0.01 to 10.0 wt % $SiO_2$, which adheres to the surfaces of said iron oxide core,
   a sphere ratio, maximum diameter/minimum diameter, of said iron oxide particles being of 0.7 to 1.0, an average particle diameter of said iron oxide particles being 0.05 to 1.0 μm, a geometric standard deviation σg of said iron oxide particles which shows the particle size distribution being not more than 1.40, a bulk density of said iron oxide particles being 0.80 to 1.5 g/cm³, and a surface activity of said iron oxide particles which is indicated by the number of cyclohexanone molecules adsorbed to the surfaces of the iron oxide particles, number of molecules/nm², being not more than 1.70; and
   90 to 99.9 parts by weight of a rubber or thermoplastic resin.

2. A rubber or resin composition according to claim 1, wherein
   said precipitate which adheres to the surfaces of the iron oxide core is a coprecipitate composed of an oxide or hydroxide of silicon and an oxide or hydroxide of at least one metal salt in which the metal is selected form the group consisting of Al, Zr, Sn and Ti,
   the amount said oxide or hydroxide of silicon is 0.01 to 10.0 wt %, calculated as $SiO_2$,
   the amount of said oxide or hydroxide of metal is 0.01 to 20.0 wt %, calculated as Al, Zr, Sn or Ti,
   the total amount of said oxide or hydroxide of silicon and said oxide or hydroxide of metal is 0.02 to 20 wt %, calculated as $SiO_2$, Al, Zr, Sn or Ti, and
   the ratio of Si to metal in said coprecipitate is 0.01:1 to 100:1.

3. A rubber or resin composition according to claim 1, wherein the amount of silicon dioxide in said iron oxide core is 0.30 to 2.00 wt %, calculated as $SiO_2$.

4. A rubber or resin composition according to claim 1, wherein the amount of said precipitate which adheres to the surfaces of said iron oxide core is 0.05 to 5.0 wt %, calculated as $SiO_2$.

5. A rubber or resin composition according to claim 1, wherein said sphere ratio of said iron oxide particles is 0.8 to 1.0, said average particle diameter thereof is 0.1 to 0.5 μm, said geometric standard deviation σg of said iron oxide particles which shows the particle size distribution is 1.0 to 1.35, said bulk density is 0.9 to 1.20 g/cm³, and said surface activity which is indicated by said number of cyclohexanone molecules adsorbed to the surfaces of said iron oxide particles is 0.8 to 1.60.

6. A rubber or resin composition according to claim 2, wherein said sphere ratio of said iron oxide particles is 0.8 to 1.0, said average particle diameter thereof is 0.1 to 0.5 μm, said geometric standard deviation σg of said iron oxide particles which shows the particle size distribution is 1.0 to 1.35, said bulk density is 0.9 to 1.20 g/cm³, and said surface activity which is indicated by said number of cyclohexanone molecules adsorbed to the surfaces of said iron oxide particles is 0.2 to 1.60.

7. A rubber or resin composition according to claim 1, wherein a BET specific surface area of said iron oxide particles is 5 to 15 m²/g and an oil absorption of said iron oxide particles is 16 to 22 ml/100 g.

8. A rubber or resin composition according to claim 2, wherein a BET specific surface area of said iron oxide particles is 5 to 40 m²/g and an oil absorption of said iron oxide particles is 18 to 40 ml/100 g.

9. A rubber or resin composition according to claim 1, wherein said thermoplastic resin is selected from the group consisting of polyvinyl chloride resin, polyester resin, polypropylene resin, polyethylene resin, polyamide resin, polycarbonate resin and acrylonitrile-butadiene-styrene terpolymer resin.

10. A rubber or resin composition according to claim 9, wherein said thermoplastic resin is polyvinyl chloride resin, polyethylene resin or acrylonitrile-butadiene-styrene terpolymer resin.

11. A rubber or resin composition according to claim 1, wherein said rubber is selected from the group consisting of natural rubber, polyisoprene rubber, polybutadiene rubber, styrene-butadiene rubber, ethylene-propylenediene rubber, acrylonitrile-butadiene rubber and silicone rubber.

12. A rubber or resin composition according to claim 2, wherein the amount of silicon dioxide which adheres to the surfaces of said iron oxide core is 0.05 to 5.0 wt %, calculated as $SiO_2$, the amount of metal oxide is 0.05 to 20.0 wt %, calculated as Al, Zr, Sn or Ti, the total amount of silicon dioxide and metal oxide and is 0.1 to 20 wt %, calculated as $SiO_2$, Al, Zr, Sn or Ti, and the ratio of Si to metal in said coprecipitate is 0.05:1 to 30:1.

13. A rubber or resin composition according to claim 1, wherein said iron oxide particles is selected from the group consisting of hematite particles, magnetite particles and maghemite particles.

* * * * *